3,546,108
NOVEL SOLVENT FOR THE EXTRACTION OF AROMATIC HYDROCARBONS FROM HYDROCARBON MIXTURES AND THE PROCESS FOR USE THEREOF
Thomas E. Skarada, Nether Providence Township, Delaware, Pa., assignor to Sun Oil Company, Philadelphia, Pa., a corporation of New Jersey
No Drawing. Filed Mar. 17, 1969, Ser. No. 807,939
Int. Cl. C10g 21/02
U.S. Cl. 208—323   4 Claims

ABSTRACT OF THE DISCLOSURE

By using as a selective solvent a mixture of furfural dimethylformamide and water, it is now possible to extract aromatics particularly dicyclic aromatics from a hydrocarbon stream in a single extraction in yields as high as prior art method but with greater purity. Thus, in the overall process giving higher yields at the same degree of purity as the prior art. For example, a particular catalytic gas oil stream was previously extracted with furfural and water in a conventional manner gave a recovery of 81% total aromatics having a purity of 88%. In order to achieve a higher degree of purity, i.e., 90+%, a second extraction with a light saturate solvent was necessary. The final purity was 91% total aromatics with a recovery of only 64%. By using furfural dimethylformamide and water solvent in a single extraction of this same catalytic gas oil stream under essentially the same conditions the purity of total aromatices was 93% and the total recovery of aromatics was 75%.

The present invention relates to a novel solvent for the extraction of hydrocarbon streams and the process of using this solvent, particularly it relates to a solvent which is used in a single stage extraction to achieve the same or better results than the prior art multistep extractions.

Furfural is widely use for the extraction of aromatics from hydrocarbon streams. The use of water to increase the sensitivity of furfural for aromatics is also well known. Water has a limited solubility in furfural and the concept of increasing solvent selectivity by increasing water content is only useful until the furfural becomes saturated with water. Dimethylformamide is a solvent which has been known for a number of years, however, it is not until recently the wide use of this material has been undertaken. It is also known that aqueous dimethylformamide is a very selective solvent for aromatics. However, if the aromatics are to be extracted from catalytic gas oil the density difference between the catalytic gas oil and the aqueous dimethylformamide is not usually sufficient to provide for a good extraction, i.e.,

|  | Specific grav. at 25° C. |
|---|---|
| Catalytic gas oil | 0.861 |
| Dimethylformamide | 0.941 |
| Dimethylformamide, 5.5% (wt.) water | 0.945 |
| Dimetrylformamide, 10.0% (wt.) water | 0.946 |

It has now been found surprisingly that a combination of furfural, dimethylformamide and water will give a solvent that has superior selectivity for aromatics so that only a single extraction is necessary in order to achieve high purity and high yields.

The solvent of the present invention can be employed to treat any hydrocarbon stream containing aromatics. It is particularly useful in the solvent refining of gas oils such as virgin gas oil, pipe still gas oil, catalytic cycle gas oils, light and/or heavy gas oils, catalytic gas oils and the like.

The novel solvent of the present invention is a mixture of 70 to 90 volume percent furfural, 5 to 25 volume percent dimethylformamide and 1 to 10 volume percent water. A more preferable solvent would be one having 75 to 80 volume percent furfural, 15 to 20 volume percent dimethylformamide and 4 to 10 volume percent water.

The solvent can be contacted with the material to be extracted in any conventional manner. For example, by countercurent contact through a vertical column or through a horizontal bed. The conditions of operation of the present process are those conventionally and previously employed for furfural. No general explanation is necessary here. However, the conditions for the use of furfural are discussed for example, in The Chemistry of Petroleum Hydrocarbons, Brooks, Kurtz, Boord and Schmerling, volume 1, Reinholt Pub. Corp., N.Y., N.Y., 1954, pps. 230–233 and L. C. Kemp, Jr., G.B. Hamilton and H. H. Gross, Industrial Engineering Chemistry, 40, 220 (1948).

Generally, however the process of the present invention employing the novel solvent disclosed herein will be carried on at temperatures in the range of 10 to 80° C. and a solvent to oil volume ratio in the range of 0.25 to 2.0. The following is an example that shows the effectiveness of the composition in extracting aromatics from a hydrocarbon stream.

EXAMPLE

The apparatus employed for the runs described below was a vertical rotating disc extractor. The extractor is 41 mm. internal diameter and 62 mm. length, divided into 31 stages, each of which is 2 mm. in height. Catalytic gas oil was passed into the extractor at the bottom and solvent pumped in at the top. The solvent was maintained as the continuous phase, the oil being dispersed in the solvent to expose a maximum surface area to enhance mass transfer. Raffinate was withdrawn from the top of the column and extract from the bottom.

The conditions of operation of apparatus and of the runs were

TABLE I

|  | Run 1 | Run 2 |
|---|---|---|
| Rotor speed, r.p.m. | 500 | 500 |
| Solvent/oil feed ratio, vol. | 0.89 | 0.85 |
| Temp., ° C. | 27.8 | 26.1 |
| Oil feed rate; lbs./ft.²/hr. | 396 | 396 |

The hydrocarbon feed used in these runs is a catalytic prefractionated gas oil having the following distribution of components in Table II.

TABLE II

|  | Wt. percent |
|---|---|
| Non-aromatics | 37.9 |
| Monocyclic aromatics | 26.7 |
| Dicyclic aromatics: |  |
|   2-methylnaphthalenes | 7.6 |
|   1-methylnaphthalene | 2.8 |
|   1- and 2-ethylnaphthalene | 2.9 |
|   2,6-dimethylnaphthalene | 3.7 |
|   2,7-dimethylnaphthalene | 3.3 |
|   Other $C_{12}$ naphthalenes | 13.6 |
|   $C_{12+}$ naphthalenes | 1.5 |
|  | 35.4 |
| Total | 100.0 |

Run 1 was made with furfural containing 2.0 volume percent water. Run 2 was made with a solvent containing 77 volume percent furfural, 19 volume percent dimethylformamide and 4 volume percent water. The results are shown in Table III.

TABLE III

|  | Run 1 furfural | Run 2 furfural/ DMF/water |
|---|---|---|
| Purity of extract oil: | | |
| Total aromatics, wt. percent | 88 | 93 |
| Dicyclic aromatics, wt. percent | 65 | 71 |
| Recovery: | | |
| Total aromatics, percent | 81 | 75 |
| Dicyclic aromatics, percent | 98 | 95 |

In order to improve the aromatic content of the furfural extract it would be normal and commercial procedure to have a second extraction step using a light saturate solvent. The light saturates solvent in a mixture of saturates, having the following boiling range:

IBP: 88° F.
20% vol. _____ 157
40 _____ 198
60 _____ 240
80 _____ 420
90 _____ 455
EP _____ 475

This solvent will remove ~25% of the non-aromatics from the furfural extract stream yielding a 90%+ aromatic extract, however, the second extraction step reduces recovery.

Set forth in Table IV are the results of the extraction with light saturates again compared with the furfural dimethylformamide and water extraction.

It can be readily seen that the furfural dimethylformamide and water solvent is superior to both furfural alone and furfural followed by a light saturate extraction.

TABLE IV

|  | Run 2 furfural/ DMF/water | Run 3 two-solvent system furfural plus light sats. |
|---|---|---|
| Purity of extract oil: | | |
| Total aromatics, wt. percent | 93 | 91 |
| Dicyclic aromatics, wt. percent | 71 | 71 |
| Recovery: | | |
| Total aromatics, percent | 75 | 64 |
| Dicyclic aromatics, percent | 95 | 79 |

The aromatics are separated from the furfural/DMF/water solvent by the usual stripping techniques and equipment now employed with furfural since all of the solvent components are more volatile than the aromatic components extracted.

The invention claimed is:

1. An aromatic selective solvent comprising a mixture of 70 to 90 volume percent furfural, 5 to 25 volume percent dimethylformamide and 1 to 10 volume percent water.

2. The solvent according to claim 1 wherein the mixture comprises 75 to 80 volume percent furfural, 15 to 20 volume percent dimethylformamide and 4 to 10 volume percent water.

3. In a process for removing aromatic compounds from a petroleum hydrocarbon mixture by single phase solvent extraction at a temperature in the range of 10 to 80° C. wherein the improvement comprises employing as the solvent a mixture comprising a mixture of 70 to 90 volume percent furfural, 5 to 25 volume percent dimethylformamide and 1 to 10 volume percent water.

4. A process according to claim 3 wherein the solvent is a mixture comprising 75 to 80 volume percent furfural, 15 to 20 volume percent dimethylformamide and 4 to 10 volume percent water.

References Cited

UNITED STATES PATENTS 2,745,790    5/1956    Manley _____ 208—327
3,366,568    1/1968    Eisenlohr et al. _____ 208—323

HERBERT LEVINE, Primary Examiner

U.S. Cl. X.R.

208—324, 327; 260—674; 252—364